United States Patent
Stump et al.

(10) Patent No.: US 12,050,458 B2
(45) Date of Patent: *Jul. 30, 2024

(54) AUTOMATED INDUSTRIAL PROCESS TESTING VIA CROSS-DOMAIN OBJECT TYPES

(71) Applicant: Rockwell Automation Technologies, Inc., Mayfield Heights, OH (US)

(72) Inventors: Andrew R. Stump, Mentor, OH (US); Srdjan Josipovic, Montreal (CA); Matthew R. Ericsson, Lyndhurst, OH (US); Michael D. Kalan, Highland Heights, OH (US); Anthony Carrara, Strongsville, OH (US); Christopher W. Como, Chagrin Falls, OH (US); Sharon M. Billi-Duran, Euclid, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/069,055

(22) Filed: Dec. 20, 2022

(65) Prior Publication Data

US 2023/0123417 A1    Apr. 20, 2023

Related U.S. Application Data

(63) Continuation of application No. 16/144,171, filed on Sep. 27, 2018, now Pat. No. 11,567,486.

(51) Int. Cl.
*G05B 23/02* (2006.01)
*G05B 19/05* (2006.01)

(52) U.S. Cl.
CPC ....... *G05B 23/0216* (2013.01); *G05B 19/054* (2013.01); *G05B 23/0272* (2013.01)

(58) Field of Classification Search
CPC ............ G05B 23/0216; G05B 23/0272; G05B 19/054
See application file for complete search history.

(56) References Cited

U.S. PATENT DOCUMENTS

| | | | |
|---|---|---|---|
| 6,874,148 B1 | 3/2005 | Richardson et al. | |
| 6,931,288 B1 | 8/2005 | Lee et al. | |

(Continued)

FOREIGN PATENT DOCUMENTS

| | | | |
|---|---|---|---|
| EP | 1284446 A1 | 2/2003 | |
| EP | 2595510 A2 | 5/2013 | |

OTHER PUBLICATIONS

Rudolph Ramler et al., "Automated testing of industrial automation software: practical receipts and lessons learned," 2014 [retrieved on Mar. 18, 2024], Proceedings of the 1st International Workshop on Modern Software Engineering Methods for Industrial Automation, pp. 7-16, <url>:https://dl.acm.org. (Year: 2014).*

(Continued)

*Primary Examiner* — Geoffrey R St Leger
*Assistant Examiner* — Stephen D Berman

(57) ABSTRACT

Various embodiments of the present technology comprise systems and methods for testing automated industrial process routines. In some examples, a software object that corresponds to a physical device in an automated industrial environment is integrated into a test routine comprising other software objects that correspond to other physical devices in the automated industrial environment. A test script of the software object is executed to test the compatibility between the software object and the other software objects in the test routine and the performance of the software object in the test routine. Test results are generated that comprise virtual measurements for the software object.

20 Claims, 7 Drawing Sheets

(56) References Cited

U.S. PATENT DOCUMENTS

| | | |
|---|---|---|
| 7,324,856 B1 | 1/2008 | Bromley |
| 7,809,683 B2 | 10/2010 | Hood et al. |
| 8,041,435 B2 | 10/2011 | Plache et al. |
| 8,904,353 B1 * | 12/2014 | Arguelles ............ G06F 11/3672 717/124 |
| 9,128,479 B2 | 9/2015 | Reichard et al. |
| 2004/0075689 A1 | 4/2004 | Schleiss et al. |
| 2005/0027376 A1 | 2/2005 | Lucas et al. |
| 2005/0027377 A1 | 2/2005 | Lucas et al. |
| 2005/0222698 A1 | 10/2005 | Eryurek et al. |
| 2006/0070035 A1 * | 3/2006 | Ulrich ................ G06F 11/3688 717/124 |
| 2006/0195817 A1 | 8/2006 | Moon |
| 2006/0259500 A1 | 11/2006 | Hood et al. |
| 2006/0277027 A1 | 12/2006 | Mann et al. |
| 2006/0277498 A1 | 12/2006 | Mann et al. |
| 2007/0132779 A1 | 6/2007 | Gilbert et al. |
| 2008/0127092 A1 | 5/2008 | Tomar |
| 2010/0050020 A1 | 2/2010 | Weatherhead |
| 2010/0083232 A1 | 4/2010 | Chouinard et al. |
| 2012/0029661 A1 | 2/2012 | Jones et al. |
| 2013/0123948 A1 | 5/2013 | Reid et al. |
| 2014/0129550 A1 | 5/2014 | Weatherhead et al. |
| 2014/0129822 A1 | 5/2014 | Weatherhead et al. |
| 2014/0130012 A1 | 5/2014 | Weatherhead et al. |
| 2015/0264080 A1 | 9/2015 | Busser et al. |
| 2015/0363543 A1 | 12/2015 | Mansouri et al. |
| 2016/0080243 A1 * | 3/2016 | Kodama ................ H04L 43/16 370/252 |
| 2016/0109875 A1 | 4/2016 | Majewski et al. |
| 2017/0060726 A1 * | 3/2017 | Glistvain ................ G06F 8/38 |
| 2017/0185594 A1 | 6/2017 | Schulz et al. |
| 2018/0107201 A1 * | 4/2018 | Cu-Unjieng ........ G06F 11/3688 |
| 2018/0113430 A1 | 4/2018 | Naidoo et al. |
| 2019/0056719 A1 | 2/2019 | Ong et al. |

OTHER PUBLICATIONS

Eilermann et al., "A general approach to module-based plant design," Elsevier, 2018, 16pg. (Year: 2018).

Borland: "Borland C++ User's Guide", Borland C++ User's Guide, Oct. 31, 1993, pp. 1-462, XP055627917, USA, http://www.bitsavers.org/pdf/borland/borland_C++_Version_4.0_Users_Guide_Oct93.pdf.

European Search Report: "EP124776_EESR", Feb. 20, 2020, pp. 1-14, Munich, Germany.

European Search Report, Jun. 5, 2020, pp. 1-13, Munich, Germany.

European Search Report, Mar. 27, 2020, pp. 1-10, European Patent Office, Munich, Germany.

Non-Final Office Action for U.S. Appl. No. 16/144,105 dated Jan. 29, 2021, 86 pages.

Notice of Allowance for U.S. Appl. No. 16/144,073 dated Apr. 1, 2021, 49 pages.

Notice of Allowance for U.S. Appl. No. 16/144,105 dated May 18, 2021, 28 pages.

Communication Pursuant to Article 94(3) EPC for EP Application No. 19199778.2; mailed Dec. 12, 2021; 5 pages.

Reinhard Hametner et al., "Test Case Generation Approach for Industrial Automation Systems," 2011 [retrieved on Sep. 26, 2022], The 5th International Conference on Automation, Robotics and Applications, pp. 58-62, downloaded from <url>:https://ieeexplore.ieee.org. (Year: 2011).

* cited by examiner

AUTOMATED INDUSTRIAL PROCESS TESTING VIA CROSS-DOMAIN OBJECT TYPES

RELATED APPLICATIONS

This U.S. patent application claims priority under 35 U.S.C. § 120 to and is a continuation of U.S. patent application Ser. No. 16/144,171 entitled, "AUTOMATED INDUSTRIAL PROCESS TESTING VIA CROSS-DOMAIN OBJECT TYPES" filed on Sep. 27, 2018, which is incorporated by reference into this U.S. patent application in its entirety for all purposes.

TECHNICAL BACKGROUND

Industrial automation processes generally include a number of routines performed by automation hardware that has been integrated to perform those routines. The hardware may include pumps, valves, tanks, sensors, and belts, among other components. Automation processes, and the routines that they include, have typically been designed and put together by engineers with little or no computer science background. However, as software has become increasingly integrated in the industrial automation industry, there has been a rise in the number of engineers with computer science backgrounds that have become part of the design team for industrial automation processes. The industrial automation industry lacks software that bridges the gap between the typical design engineer with little or no computer science background, and the engineers with a background in computer science that expect certain system building and testing functionality from automation routine design applications.

It is with respect to this general technical environment that aspects of the present technology disclosed herein have been contemplated. Furthermore, although a general environment has been discussed, it should be understood that the examples described herein should not be limited to the general environment identified in the background.

Overview

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Non-limiting examples of the present disclosure describe systems, methods, and devices for assisting with testing automated industrial process routines. One or more software automation objects may be added to a test application user interface from a software object library. A simple drag and drop mechanism for adding software automation objects to the test framework may be utilized. For example, a display element corresponding to a software automation object may be dropped in an area with one or more other software automation objects as part of an automated routine, and test scripts may be applied to the objects at a system level for the automated routine. Each software object in the library (including the objects added to the test application user interface) may comprise an automated control device layer, a human machine interface layer, and a testing layer. The testing layer may include one or more test scripts for executing on each corresponding software object. The test scripts may be applied to a single object, or to a single object as part of a larger automation routine or process. In some examples, one or more virtualized industrial controllers may be utilized in executing a test script on a software automation object. Test results may be caused to be displayed by the test application once a test script has been fully executed on one or more software automation objects. The test results may indicate whether a tested software object performed as expected when a test script was applied to it, whether errors occurred when a test script was applied to it, and/or whether an automated routine was virtualized appropriately during execution of a test script.

TECHNICAL DESCRIPTION

Figure 1:
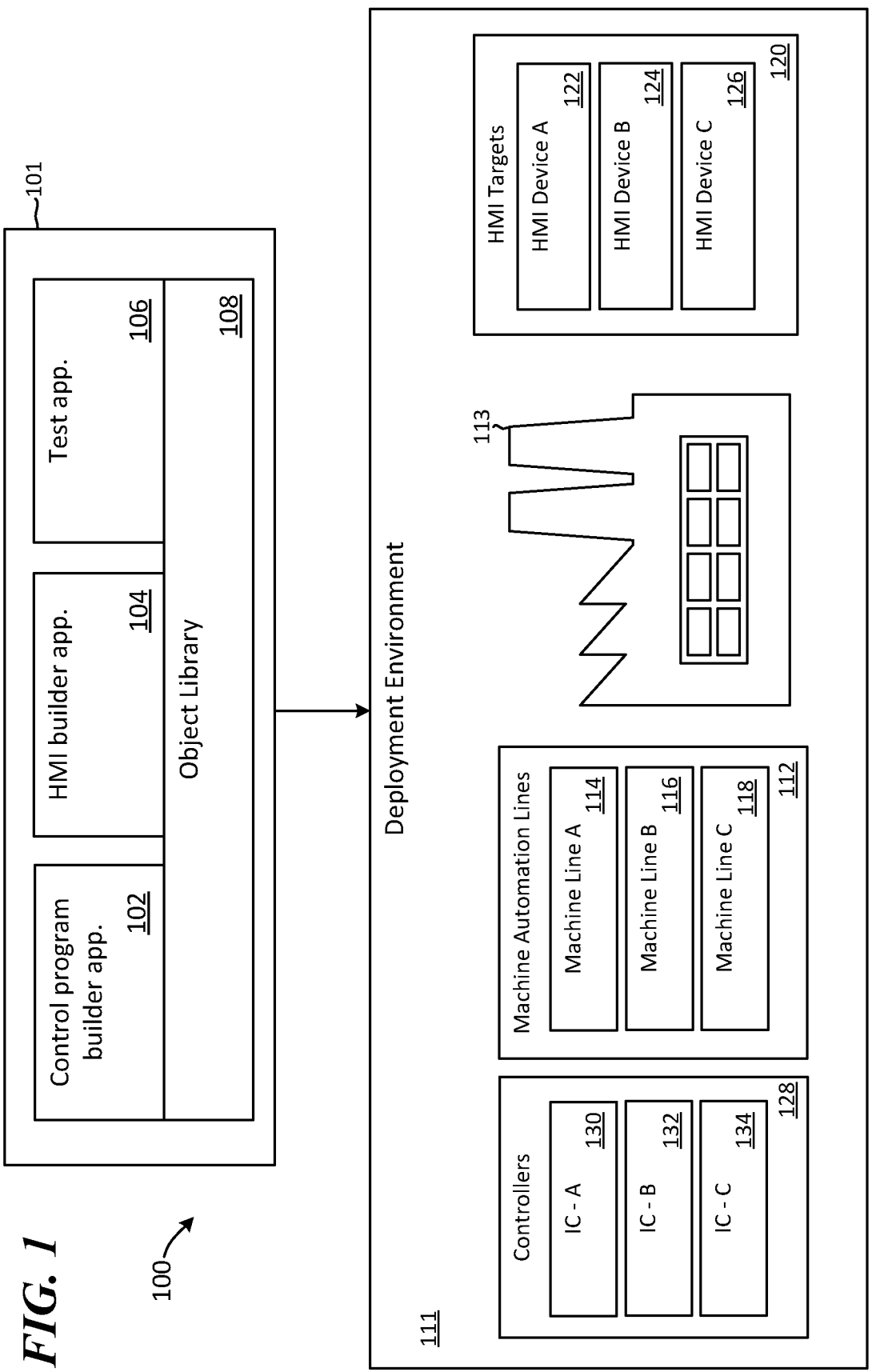
FIG. 1 is a schematic diagram of an exemplary distributed computing environment for assisting with testing automated industrial process routines.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Generally, the present disclosure is directed to systems, methods, and devices for assisting with testing automated industrial process routines. A test framework is provided whereby one or more software automation objects can be selected from a software object library and introduced into an object testing application. Each of the software automation objects may be associated with a test layer that comprises one or more test scripts that may be applied to a corresponding object. In some examples, each class of objects may have a set of test scripts that can be applied to it (e.g., valve objects may have a first set of test scripts that can be applied to them, tank objects may have a second set of test scripts that can be applied to them). Once selected, a software automation object may be displayed on a user interface of the object testing application. A test script may be executed on the software automation object as an independent object and/or a test script may be executed on the object as part of a system for implementing an automated routine (e.g., a software object incorporated with other software objects corresponding to the hardware components of an industrial automation routine). A software automation object may be integrated with other software automation objects by, for example, dragging and dropping a visual representation of the object in an appropriate display location in relation to other display elements corresponding to the other software automation objects.

Technical advantages are accomplished by the current disclosure over existing technologies. For example, processing costs (CPU cycles) associated with testing industrial automation routines are reduced because, according to aspects described herein, test scripts can be explicitly associated with various software automation object types and reused regardless of how many routines an object is incorporated in, and/or how many copies of the object are introduced in those routines. Previously, test scripts would have to be custom-created from scratch for each routine and each object, significantly increasing the time, resources, and processing costs associated with testing each routine. Storage costs associated with storing large custom files for each routine are also reduced by the mechanisms described herein, as test scripts may be created on-the-fly by combining objects into automated routine systems, rather than having to store test scripts for each routine if repeated tests are desired.

FIG. 1 is a schematic diagram of an exemplary distributed computing environment 100 for assisting with testing automated industrial process routines. Computing environment 100 includes automated industrial process software build sub-environment 101, machine automation lines sub-environment 112, HMI targets sub-environment 120, and controllers sub-environment 128. Any and all of the computing devices with regard to the various distributed computing environments described herein may communicate with one another via one or more wired or wireless networks. In some examples, controller sub-environment 128, machine automation lines sub-environment 112, and/or HMI targets sub-environment 120, may be deployed together in an industrial automation process factory setting, such as in factory 113 in deployment environment 111.

Automated industrial process software build sub-environment 101 includes control program builder application 102, HMI builder application 104, and test application 106, although other industrial automation applications are contemplated. Automated industrial process software build sub-environment 101 also includes object library 108, which comprises a plurality of automated software objects that one or more of the applications in industrial process software build sub-environment 101 may share and/or access. In some examples, object library 108 may be stored locally on one or more computing devices associated with any of control program builder application 102, HMI builder application 104 and/or test application 106. In other examples, object library 108 may be located remotely (e.g., in cloud storage), and one or more computing devices executing control program builder application 102, HMI builder application 104, and/or test application 106, may access object library 108 via a wired or wireless network.

Control program builder application 102 comprises an application for building industrial automation software modules (e.g., single automation control device files, multiple automation control device files) for execution by one or more industrial controllers (e.g., industrial controller—A 130, industrial controller—B 132, industrial controller—C 134) in the performance of routines of an automated industrial process. In some examples, the industrial automation software modules that may be built using control program builder application 102 may comprise ladder logic, function block diagram, sequential function chart, structured text, instruction list, C, and C++, among other software forms.

A ladder logic software module may comprise one or more ladder logic statements, referred to as rungs or instructions. The ladder logic statements define relationships between an output variable and one or more input variables. Input variables are variables that correspond to signals at input terminals and output variables are variables that correspond to signals at output terminals. In relay ladder logic, the input and output signals may be represented graphically as contact symbols and coil symbols arranged in a series of rungs spanning a pair of vertical power rails. A typical ladder logic statement may indicate that a specific output variable is "on" if and only if a first and second input is "on". The ladder logic software module, executed by one or more industrial controllers, manipulates single-bit input and output data representing the state of sensing and operating devices, such as devices machine automation lines sub-environment 112 (e.g., machine line A 114, machine line B 116, machine line C 118) in a factory setting. The ladder logic software module, executed by the one or more industrial controllers, also performs arithmetic operations, timing and counting functions and more complex processing operations. As noted above, however; a controller logic may be created in other software languages, and at its core, the logic functions by taking in inputs from field devices, performing calculations and operations on those inputs, and writing outputs for controlling the field devices based on the calculations.

HMI builder application 104 is an application for building industrial automation software modules (e.g., single HMI configuration files, multiple HMI configuration files) for execution on HMI devices in HMI targets sub-environment 120, which may include typical HMI devices such as dedicated HMI panels, as well as deployment of automation visualization interfaces on computing devices such as smart phones and tablets. An HMI typically receives, via one or more controllers, and processes the status data from devices performing various routines in an industrial automation process (e.g., devices in machine automation lines sub-environment 112, which are deployed in factory 113). An HMI processes, utilizing one or more industrial automation software modules built in HMI builder application sub-environment 104, the status data to generate various graphical displays, which may indicate the current and historical performance of the machines. For example, an HMI graphical display might indicate status metrics of a drive, the pressure of a pump, the speed of a motor, or the output of a robot, each of which may be performing operations that are part of a routine executed in machine automation lines sub-environment 112, controlled from one or more industrial controllers in controllers sub-environment 128.

Test application 106 may perform one or more operations associated with loading industrial automation software modules into virtualized industrial controllers and running one or more industrial automation routines encoded as instructions in the software modules on the virtualized industrial controllers. Test application 106 may utilize the properties of various objects from object library 108 employed in the execution of one or more routines to determine whether new industrial automation software controller modules created in control program builder application 102 perform as desired. Test application 106 may also utilize the properties of various objects from object library 108 employed in the execution of one or more routines to determine whether new industrial automation software HMI modules created in HMI builder application 104 perform as desired. If bugs or unintended issues arise in the testing of one or more routines, test application 106 may identify an object and or software module associated with the problem and flag it for review.

The industrial controllers in controllers sub-environment 128 (industrial controller—A 130, industrial controller—B 132, and industrial controller—C 134) are special purpose computers used for controlling factory devices performing one or more routines in machine automation lines sub-environment 112. Under the direction of one or more industrial automation software modules (e.g., industrial automation software modules built by control program builder application 102), a processor of an industrial controller examines a series of inputs reflecting the status of a controller process or device and changes outputs affecting control of the controlled process or device. The industrial controllers in controllers sub-environment 128 may be constructed in modular fashion to accommodate different application types requiring different numbers and types of input/output (I/O) circuits as is determined by the particular device or process being controlled.

Industrial automation software modules may be delivered to the industrial controllers in source format, token format, object code or executable code. These modules can bind to and use hardware, firmware and/or operating system resources of the industrial controllers. Loadable libraries may be provided to the industrial controllers during runtime to extend functionality and/or provide desired fixes. The stored industrial automation software modules run in real-time or near real-time to provide outputs to the control processes as electrical signals to outputs such as actuators and the like. The outputs are based on the logic of an industrial automation software module and inputs received from sensors of a controlled process being performed in machine automation lines sub-environment 112 in a factory such as in factory 113. One or more industrial controllers may be involved in the performance of routines in machine automation lines sub-environment 112, and the industrial controllers involved in those routines may communicate with the various devices performing those routines via local connections, such as by ethernet, or over a wireless network.

One or more of the industrial controllers in controllers sub-environment 128 may comprise programmable logic controllers (PLCs), which execute a series of operations that are performed sequentially and repeatedly. In general, the series of operations includes an input scan, a program/module scan, and an output scan. During the input scan the PLC examines the on or off state of the external inputs and saves these states temporarily in memory. During the program/module scan the PLC scans the instruction of the program/module and uses the input status to determine if an output will be energized. The output results are then saved to memory. During the output scan the controller will energize or de-energize the outputs based on the output results stored in memory to control the external devices.

The computing devices in computing environment 100 utilize object-oriented programming techniques. Additionally, the various sub-environments in computing environment 100 may utilize shared object programming techniques whereby objects in object library 108, and the objects' properties, are shared amongst software modules (e.g., HMI software modules in HMI targets sub-environment 120, controller software modules in controllers sub-environment 128). Object oriented programming shifts the emphasis of software development away from function decomposition and towards the recognition of units of software called "objects" which encapsulate both data and functions. Object oriented programming objects are software entities comprising data structures and operations on data. Together, these elements enable objects to model virtually any real-world entity in terms of its characteristics, represented by its data elements, and its behaviors represented by its data manipulation functions. In this way, objects can model concrete things like physical components of automated industrial processes (e.g., pumps, belts, filters, tanks, computers), and they can model abstract concepts like numbers or geometrical concepts (e.g., flow rate values, tank volumes, connection types).

Each object in object library 108 may comprise a set of data (e.g., attributes) and a set of operations (e.g., methods), that can operate on the data. Each object in object library 108 may additionally or alternatively comprise a set of renderings that can display a set of data, self-describing documentation, one or more graphs that trace object data, and/or a set of configurations that provide alarms related to the data. Methods in an object are invoked by passing a message to the object. The message specifies a method name and an argument list. When the object receives the message, code associated with the named method is executed with the formal parameters of the method bound to the corresponding values in the argument list. Methods and message passing in object-oriented programming are analogous to procedures and procedure calls in procedure-oriented software environments.

However, while procedures operate to modify and return passed parameters, methods operate to modify the internal state of the associated objects (by modifying the data contained therein). The combination of data and methods in objects is called encapsulation. Encapsulation provides for the state of an object to only be changed by well-defined methods associated with the object. When the behavior of an object is confined to such well-defined locations and interfaces, changes (e.g., code modifications) in the object will have minimal impact on the other objects and elements in the system.

Each object in object library 108 represents a class of some control element. A class includes a set of data attributes plus a set of allowable operations (e.g., methods) on the data attributes. Object oriented programming supports inheritance—a class (called a subclass) may be derived from another class (called a base class, parent class, etc.), where the subclass inherits the data attributes and methods of the base class. The subclass may specialize the base class by adding code which overrides the data and/or methods of the base class, or which adds new data attributes and methods. Thus, inheritance represents a mechanism by which abstractions are made increasingly concrete as subclasses are created for greater levels of specialization. One or more objects in object library 108 may comprise complex objects built from multiple instances of similar objects. Systems, methods, and devices described herein may employ abstract object classes, which are designs of sets of objects that collaborate to carry out a set of responsibilities. Frameworks are essentially groups of interconnected objects and classes that provide a prefabricated structure for a working application. Additional description related to the objects and their implementation in the current invention is provided in relation to FIG. 2.

Figure 2:
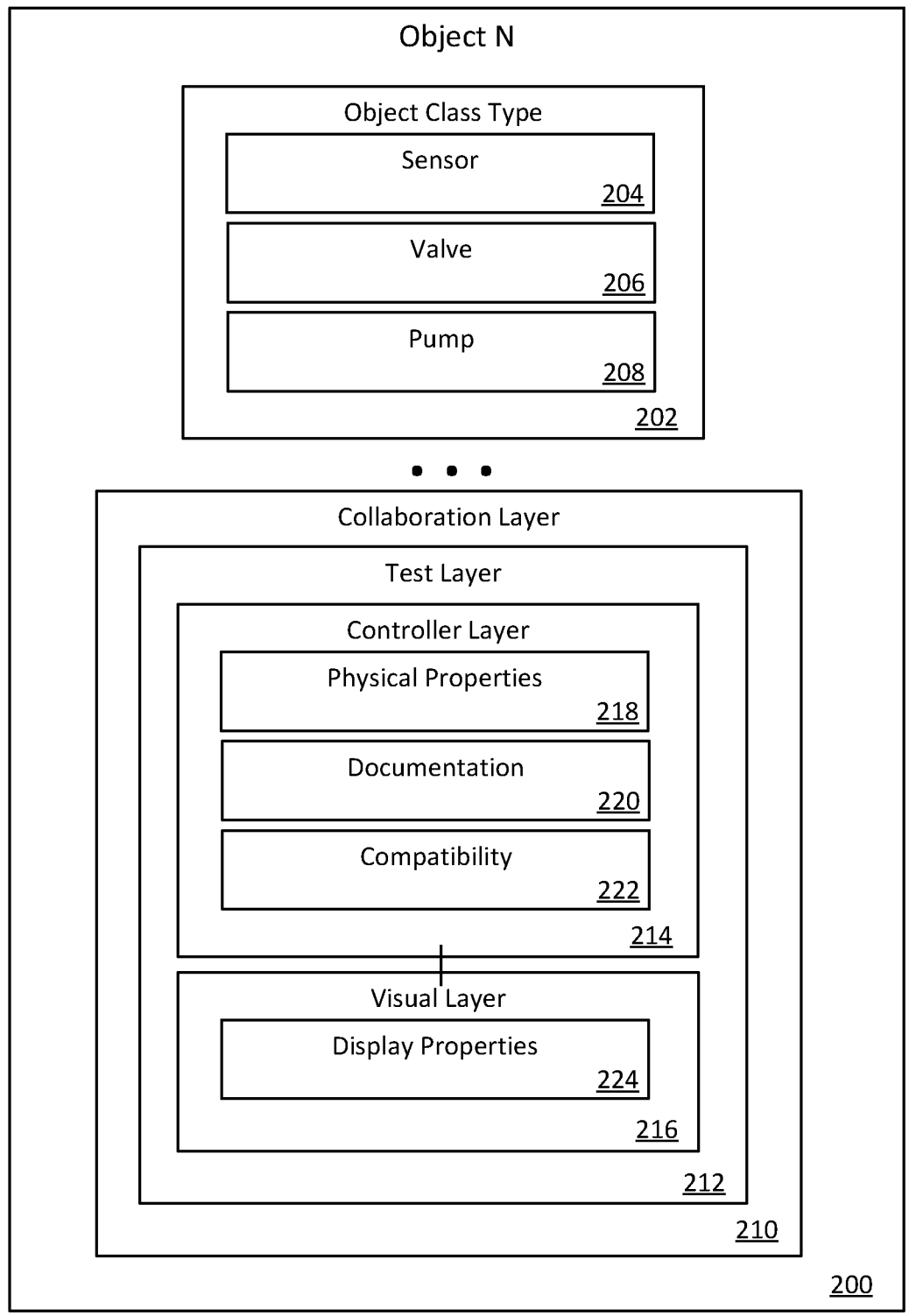
FIG. 2 is a simplified block diagram of an exemplary automation software object and its various components, which may be utilized in the control and visualization of industrial automation processes.

FIG. 2 is a simplified block diagram of an exemplary automation software object 200 and its various components, which may be utilized in the control and visualization of industrial automation processes and routines. Object 200 is an automation software object that may be included as part of a software object library, such as object library 108. In some examples, object 200 may be incorporated in controller software modules for execution by one or more industrial controllers for controlling operations associated with automated industrial processes and routines, and/or virtualized industrial controllers for virtually controlling operations associated with automated industrial processes and routines. In additional examples, object 200 may be incorporated in HMI software modules for execution by one or more HMIs for generating various graphical displays, which may indicate the current and historical performance of the machines associated with automated industrial processes and routines. In additional examples, object 200 may be incorporated in both HMI software modules and controller software modules.

Object 200 comprises a class type 202. While various class types are possible for assignment to object 200, for exemplary purposes, object 200 is indicated as having one of a sensor class type 204, a valve class type 206, or a pump class type 208 assigned to it. The class types depicted in the object class type 202 element each correspond to a common hardware type in industrial automation processes, and they are provided for exemplary purposes; however, users may also create their own class types, which may correspond to combinations of product types and/or product skids (e.g., combinations of devices for performing various automation routines). Additionally, although broad class types are shown for ease of example, each class type may have sub-class types as well (e.g., specific types of sensors, valves, pumps, controllers, displays, etc.), for which more exact specifications may be associated with object 200.

Object 200 also includes collaboration layer 210, test layer 212, controller layer 214, and visual layer 216. Controller layer 214 comprises a plurality of properties and property types, including physical properties 218, documentation properties 220, and compatibility property type 222. In some examples, controller layer 214 may also comprise controller code and/or properties.

Documentation properties 220 may include information about the specific object type specified in object class type 202. For example, if object 200 is a specific brand and type of valve, documentation properties 220 may specify the name of the manufacturer of the valve, actions that may be performed by the valve, operating pressures that the valve can withstand, operating temperatures that the valve can withstand, flow rate, etc. If object 200 is a specific brand and type of temperature sensor, documentation properties 220 may specify the name of the manufacturer of the sensor, temperature range of the sensor, accuracy range of the sensor, scan frequency of the sensor, etc. If object 200 is a specific brand and type of pump, documentation properties 220 may specify the name of the manufacturer of the pump, maximum discharge flow for the pump, maximum discharge pressure for the pump, operating temperatures that the pump can withstand, horsepower for the pump, etc.

Compatibility properties 222 may also include information about the specific object type specified in object class type 202. For example, if object 200 is a specific brand and type of valve, compatibility properties 222 may specify types of service the valve is intended to handle (e.g., air, gas, liquid, vacuum), connection types, etc. If object 200 is a specific brand and type of temperature sensor, compatibility properties 222 may specify types of environments it is intended to handle (e.g., air, gas, liquid, vacuum), connection types, etc. If object 200 is a specific brand and type of pump, compatibility properties 222 may specify types of service the pump is intended to handle (e.g., types of fluid), connection types, etc.

Physical properties 218 include the physical specifications (e.g., size, geometry, mass, material etc.) of object 200.

Visual layer 216 includes display properties, which in association with one or more physical properties 218, documentation properties 220, and/or compatibility properties 222, may be utilized to accurately generate display components in real-time corresponding to components operating in an industrial automation routine. For example, display properties 224 may include various color properties for types of liquid and gas in an industrial automation routine, and when data from pumps, sensors and tanks from the routine are processed by the HMI and/or an industrial controller, those physical properties may be translated with the appropriate color types for the liquid and/or gas involved in the routine for graphically displaying the current state of the routine.

Controller layer 214 comprises a plurality of industrial controller-oriented operations/methods that may be performed by an industrial controller utilizing one or more properties of object 200, such as physical properties 218, documentation properties 220, compatibility properties 222, and/or display properties 224 (in association with visual layer 216). The operations performed by the industrial controller utilizing instructions associated with controller layer 214 direct hardware components of industrial automation processes to perform actions associated with ladder logic routines via various I/O communications as more fully described above.

Test layer 212 comprises a plurality of industrial controller-oriented operations/methods that may be performed by a virtual industrial controller utilizing one or more properties of object 200. The test layer may be associated with the performance of test script operations on object 200 that a typical industrial controller would be expected to perform, while flagging failed operations or operations that lead to unexpected results. Test layer 212 may also include a plurality of HMI-oriented operations/methods that may be performed by an HMI or virtualized HMI utilizing one or more properties of object 200, including display properties 224, physical properties 218, documentation properties 220, and/or compatibility properties 222.

Collaboration layer 210 comprises a plurality of operations/methods that may be performed on one or more properties of object 200. The collaboration operations/methods permit multi-user access to a control project, including centralized control, message coding from one user to another, collaborative development of industrial automation projects, such as collaborative development of application code for an industrial controller or design of an industrial automation process system. According to some examples, operations associated with collaboration layer 210 may provide mechanisms for users to leave notes for one another in association with objects and/or industrial automation projects that objects are included in. In additional examples, the operations associated with collaboration layer 210 may provide mechanisms for users to flag issues associated with development of industrial automation projects. In some examples, the operations associated with collaboration layer 210 may provide for cross-domain collaboration (e.g., a first user may leave a note related to an object while working with the object in HMI code and the note may be surfaced to a second user in relation to the same object in controller code that the second user is working on). In other examples, the operations associated with collaboration layer 210 may provide for same-domain collaboration (e.g., a first user may leave a note related to an object in a first area and/or routine of controller code and the note may be surfaced to a second user in relation to the same object in a second area and/or routine of controller code that the second user is working on).

Figure 3:
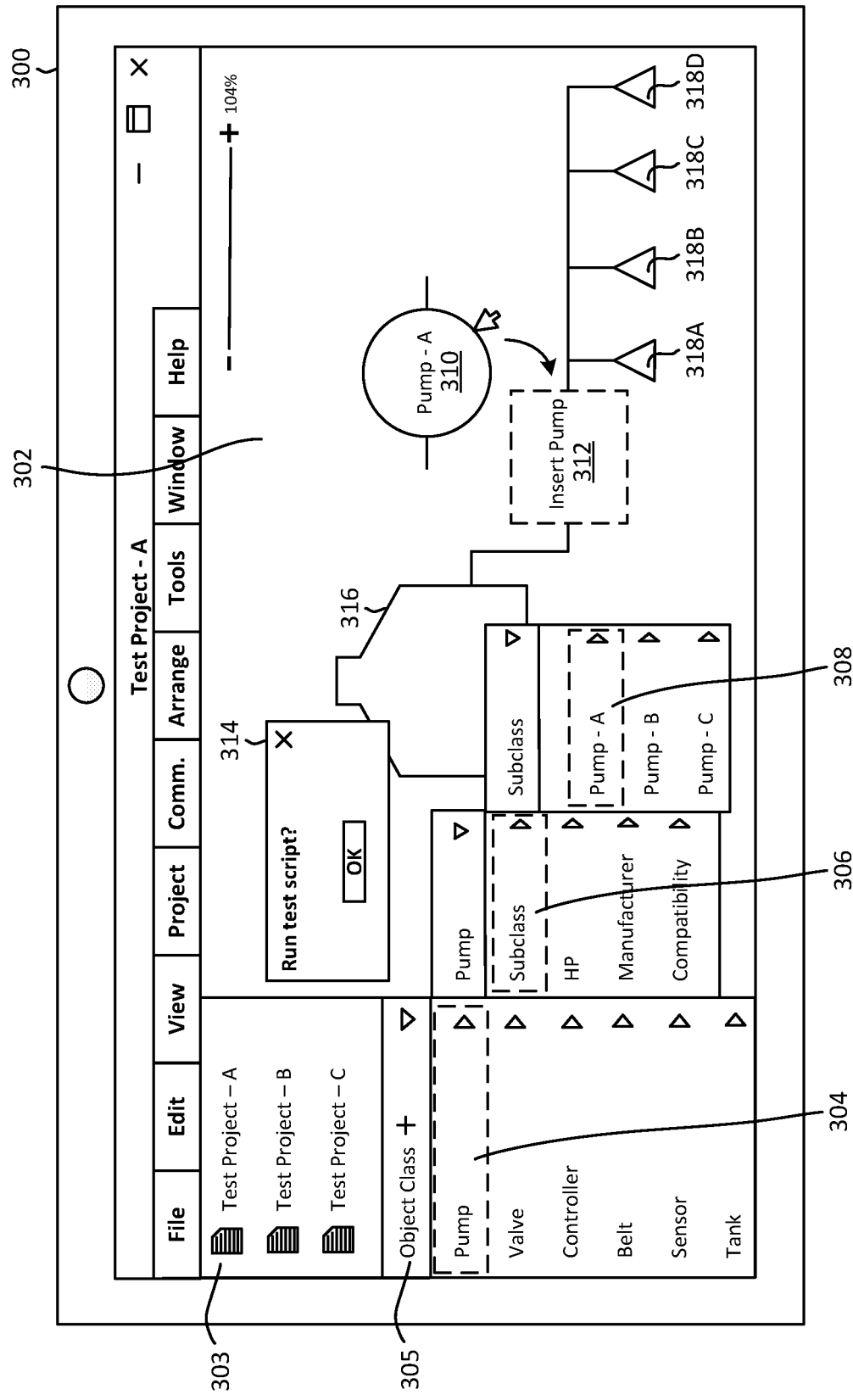
FIG. 3 is a simplified block diagram of a computing device displaying a user interface for interacting with industrial automation objects for integration in an automation routine and testing the automation routine after the objects have been integrated.

FIG. 3 is a simplified block diagram of a computing device 300 displaying a user interface 302 for interacting with industrial automation objects for integration in an automation routine and testing the automation routine after the objects have been integrated.

User interface 302 is a user interface for an industrial automation testing application or a testing sub-unit of an industrial automation application, which will hereinafter be referred to simply as "testing application". The testing application may be utilized to create and modify industrial automation routines and test those routines. Specifically, a user may navigate menus in the testing application to identify software automation objects (e.g., objects for pumps, controllers, tanks, valves) by various tags and/or keywords, combine those objects as parts of automation routines, and test the objects using a virtualized industrial controller. The testing application utilizes a user-friendly approach, whereby individual software automation objects that correspond to hardware components of an automated routine may be combined with other software automation objects on user interface 302 via simple drag and drop input mechanisms and/or click input mechanisms.

User interface 302 for the testing application comprises a plurality of test project files 303 in the upper left corner, which may be selected for initiating editing and testing of those respective projects/automated routines. In this example, the plurality of test project files 303 comprise "Test Project—A", "Test Project—B", and "Test Project—C". While not shown, users may also create entirely new automation routines for testing and eventual implementation in actual industrial routine hardware. In this example, a user has selected and opened the "Test Project—A" file, which is displayed on user interface 302. Test Project—A comprises display elements corresponding to software automation objects for industrial automation hardware components including: tank object 316, valve objects 318A-318D, and pump object 310 (Pump—A), which a user has selected for adding to the tank-valve assembly.

A navigable set of pop-out windows has been utilized to select one or more of the software automation objects that are displayed on user interface 302. In this example, a user has previously added tank object 316 and valve objects 318A-318D to user interface 302. The user would like to add a new pump to the system. The pump may replace an old pump that was connecting tank object 316 and valve objects 318A-318D, or the pump may be completely new to the system. To identify a pump for insertion in the system, a user navigates object class selection menu 305, where a plurality of software automation objects are organized in a drop-down menu by class type. For exemplary purposes, the drop-down selection menu includes a selectable pump class element 304, a selectable valve class element, a selectable controller class element, a selectable belt class element, a selectable sensor class element, and a selectable tank class element. In this example, a user has selected the selectable pump class element 304. The user may select pump class element 304 by, for example, hovering a cursor over the element, clicking on the element, using a touch input, etc.

When pump class element 304 is selected, a first fly-out window is caused to be displayed on user interface 302. The first fly-out window includes a plurality of selectable elements for identifying a pump for insertion into the system displayed on user interface 302. The selectable elements are pump classifications that pump types are organized into for further honing a pump type that a user would like to insert into the system. In this example, the first fly-out window includes a selectable pump subclass element 306, a selectable horsepower element, a selectable manufacturer element, and a selectable compatibility element. Pump subclass element 306 is illustrative of any class that pumps may be categorized in. This class may be user-created or pre-loaded in the testing application.

When pump subclass element 306 is selected, a second fly-out window is caused to be displayed on user interface 302. The second fly-out window includes individual pumps that are categorized in the "subclass" element corresponding to subclass element 306. It should be understood that there may be more or fewer levels of class type classifications for each software automation object type in the testing application. The selectable pumps under the subclass element are "Pump—A" 308, "Pump—B", and "Pump—C". In this example, a user has selected "Pump—A" 308 from the second fly-out window, and pump object 310 (Pump—A) is caused to be surfaced on user interface 302. A user may then select pump object 310 and integrate it with the other objects on user interface 302. Specifically, a user may insert pump object 310 at insert pump element 312, where pump object 310 may be integrated with tank object 316 and valve objects 318A-318D in the system. The insertion may be accomplished via a drag and drop operation, a click operation, a touch operation, and the like.

The testing application running on computing device 300 may utilize a software object library, such as object library 108 in FIG. 1, that software automation objects may be added to test projects from. A test layer of each software automation object may include one or more test scripts for testing each object alone or in combination with one or more additional software objects. For example, a test script for pump object 310, alone or in association with test scripts for tank object 316 and valve objects 318A-318D, may be utilized in association with a test script for an industrial controller object test script (not shown), to determine whether the objects in the system function as expected, whether they will perform the operations the user expects of them in an industrial automation routine, and/or whether they will perform together appropriately based on various criteria (e.g., flow rate, temperature, timing) specified by a testing user.

In this example, after inserting pump object 310 in insert pump element 312, the user navigating the testing application selected a specific test script to run on pump object 310 and/or pump object 310 and one or more other software automation objects associate with pump object 310. Although the specific test script that the user selected is not shown, once selected, the "run test script" pop-up window 314 is caused to be surfaced on user interface 302. When the user indicates via pop-up window 314 that the test script is to be executed, the selected test script may be applied from the test layer of each software automation object that the test script is run on, and results of the test may be caused to be displayed on user interface 302. The results may indicate whether the objects performed as expected, whether there were unexpected results, whether the routine implemented during the test on the objects was satisfactorily executed or not, etc. For example, if pump object 310 is incompatible with either of tank object 316 or valve objects 318-318D, a failed test may be indicated to the user. Similarly, if pump object 310 does not have satisfactory components necessary to create flow from tank object 316 to valve objects 318-

318D, a "low flow" result may be indicated to the user. Other test results are possible as would be understood by those of skill in the art.

Figure 4:
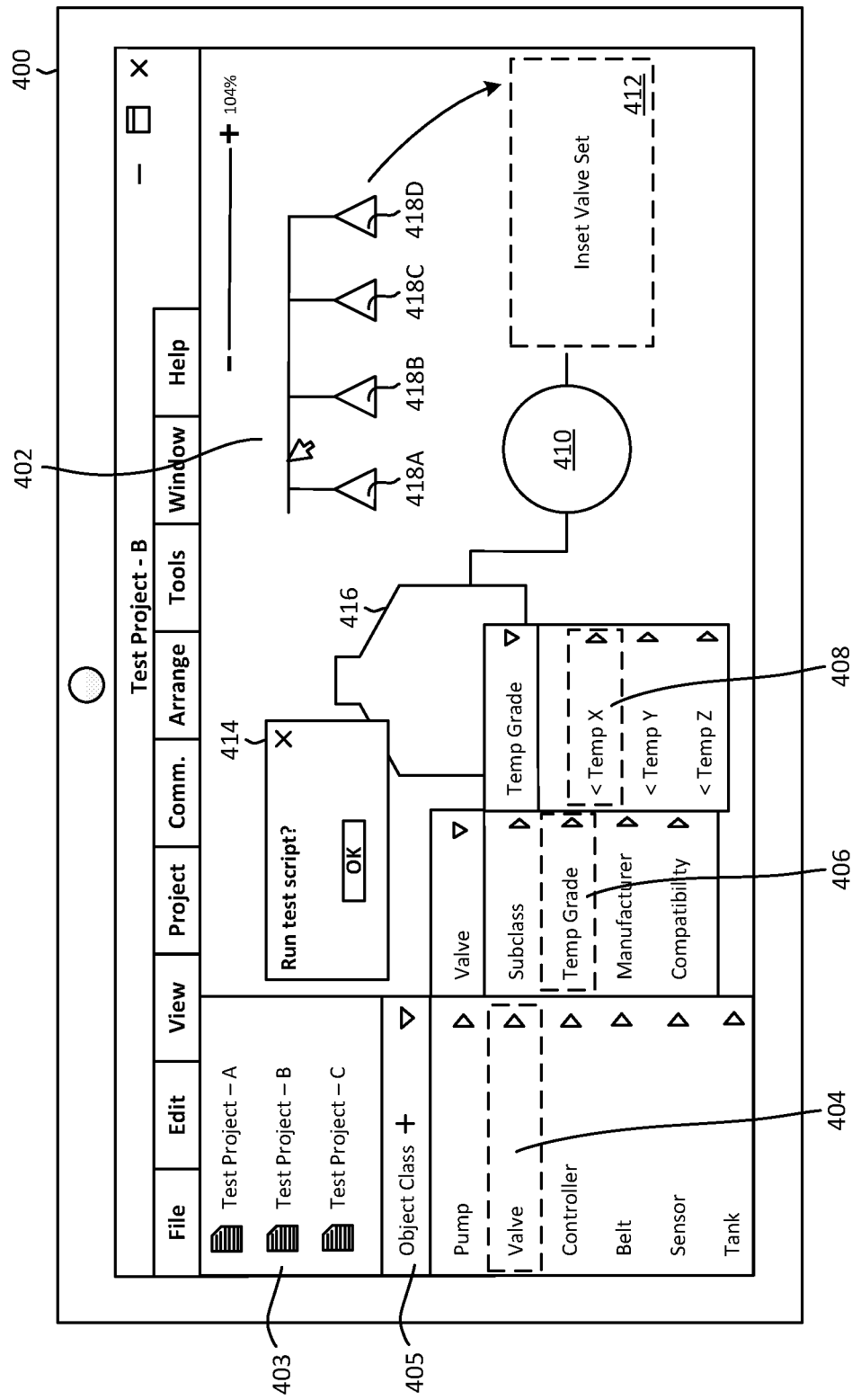
FIG. 4 is another simplified block diagram of a computing device displaying a user interface for interacting with industrial automation objects for integration in an automation routine and testing the automation routine after the objects have been integrated.

FIG. 4 is another simplified block diagram of a computing device 400 displaying a user interface 402 for interacting with industrial automation objects for integration in an automation routine and testing the automation routine after the objects have been integrated.

User interface 402 is a user interface for an industrial automation testing application or a testing sub-unit of an industrial automation application, which will hereinafter be referred to simply as "testing application". The testing application has the same features as those that were described above in relation to the testing application of FIG. 3. However, the testing application of FIG. 4 is being utilized to add a different set of software automation objects to the system than was discussed in FIG. 3.

User interface 402 for the testing application comprises a plurality of test project files 403 in the upper left corner, which may be selected for initiating editing and testing of those respective projects/automated routines. In this example, the plurality of test project files 403 comprise "Test Project—A", "Test Project—B", and "Test Project—C". While not shown, users may also create entirely new automation routines for testing and eventual implementation in actual industrial routine hardware. In this example, a user has selected and opened the "Test Project—B" file, which is displayed on user interface 402. Test Project—B comprises display elements corresponding to software automation objects for industrial automation hardware components including: tank object 416, pump object 410, and valve objects 418A-418D, which a user has selected for adding to the tank-pump assembly.

A navigable set of pop-out windows has been utilized to select one or more of the software automation objects that are displayed on user interface 402. In this example, a user has previously added tank object 316 and pump object 410 to user interface 402 and Test Project—B. The user would like to add a new set of valves to the system. The valve set may replace an old valve set that was part of the system, or the valve set may be completely new to the system. To identify a valve set for insertion in the system, a user navigates object class selection menu 405, where a plurality of software automation objects are organized in a drop-down menu by class type. For exemplary purposes, the drop-down selection menu includes a selectable valve class element 404, a selectable pump class element, a selectable controller class element, a selectable belt class element, a selectable sensor class element, and a selectable tank class element. In this example, a user has selected the selectable valve class element 404 by, for example, hovering a cursor over the element, using a touch input, etc.

When valve class element 404 is selected, a first fly-out window is caused to be displayed on user interface 402. The first fly-out window includes a plurality of selectable elements for identifying one or more valves for insertion into the system displayed on user interface 402. The selectable elements are valve classifications that valve types are organized into for further honing a valve type that a user would like to insert into the system. In this example, the first fly-out window includes a selectable temperature grade element 406, a selectable subclass element, a selectable manufacturer element, and a selectable compatibility element. Selectable temperature grade element 406 may correspond to a plurality of valves that are organized by maximum and minimum temperature ranges of fluids/gasses that the valves are rated for. This class may be user-created or pre-loaded in the testing application. In some examples, this class may be intelligently added to the object library, by for example, receiving product documentation for valve objects from manufacturers, and automatically grouping valve objects according to the temperature grades/thresholds included in the documentation. The temperature grades/thresholds, and/or the documentation, may be associated with each of the valve objects as properties associated with one or more object layers in the object library.

When selectable temperature grade element 406 is selected, a second fly-out window is caused to be displayed on user interface 402. The second fly-pout window includes valves that are categorized based on temperatures that they can withstand (e.g., temperatures less than X, temperatures less than Y, temperatures less than Z). For exemplary purposes it is assumed that there is one valve that is indicated in the classification as having a temperature that it can withstand of less than X. In this example, a user has selected "Temp X" valve 408 from the second fly-out window, and selected a number of those valves that the user would like to incorporate in the system of test project B. As such, valve objects 418A-418D are caused to be surfaced on user interface 402. A user may then select valve objects 418A-418D and integrate the valve set with the other objects on user interface 402. Specifically, a user may insert valve objects 418-A-418D at insert valve set element 412, where valve objects 418A-418D may be integrated with tank object 316 and pump object 410 in the system. The insertion may be accomplished via a drag and drop operation, a click operation, a touch operation, and the like.

The testing application running on computing device 400 may utilize a software object library, such as object library 108 in FIG. 1, that software automation objects may be added to test projects from. A test layer of each software automation object may include one or more test scripts for testing each object alone or in combination with one or more additional software objects. For example, a test script for testing valve objects 418A-418D, alone or in association with test scripts for tank object 416 and pump object 410, may be utilized in association with a test script for one or more industrial controller object test scripts (not shown), to determine whether the objects in the system function as expected, whether they will perform the operations the user expects of them in an industrial automation routine, and/or whether they will perform together appropriately based on various criteria (e.g., flow rate, temperature, units produced, timing) specified by a testing user.

In this example, after inserting valve objects 418A-418D in insert valve set 412, the user navigating the testing application selected a specific test script to run on one or more of valve objects 418A-418D, and or one or more of valve objects 418A-418D and one or more other software automation objects association with valve objects 418A-418D. Although the specific test script that the user selected is not shown, once selected, the "run test script" pop-up window 414 is caused to be surfaced on user interface 402. When the user indicates via pop-up window 414 that the test script is to be executed, the selected test script may be applied from the test layer of each software automation object that the test script is run on, and results of the test may be caused to be displayed on user interface 402. The results may indicate whether the objects performed as expected, whether there were unexpected results, whether the routine implemented during the test on the objects was satisfactorily executed or not, etc. For example, if valve objects 418A-418D are incompatible with either of tank object 416 or pump object 410, a failed test may be indicated to the user.

Similarly, if fluid or gas from tank 416 exceeds the temperature range for valve objects 418A-418D, a failed test may be indicated to the user. Other test results are possible as would be understood by those of skill in the art.

Figure 5:
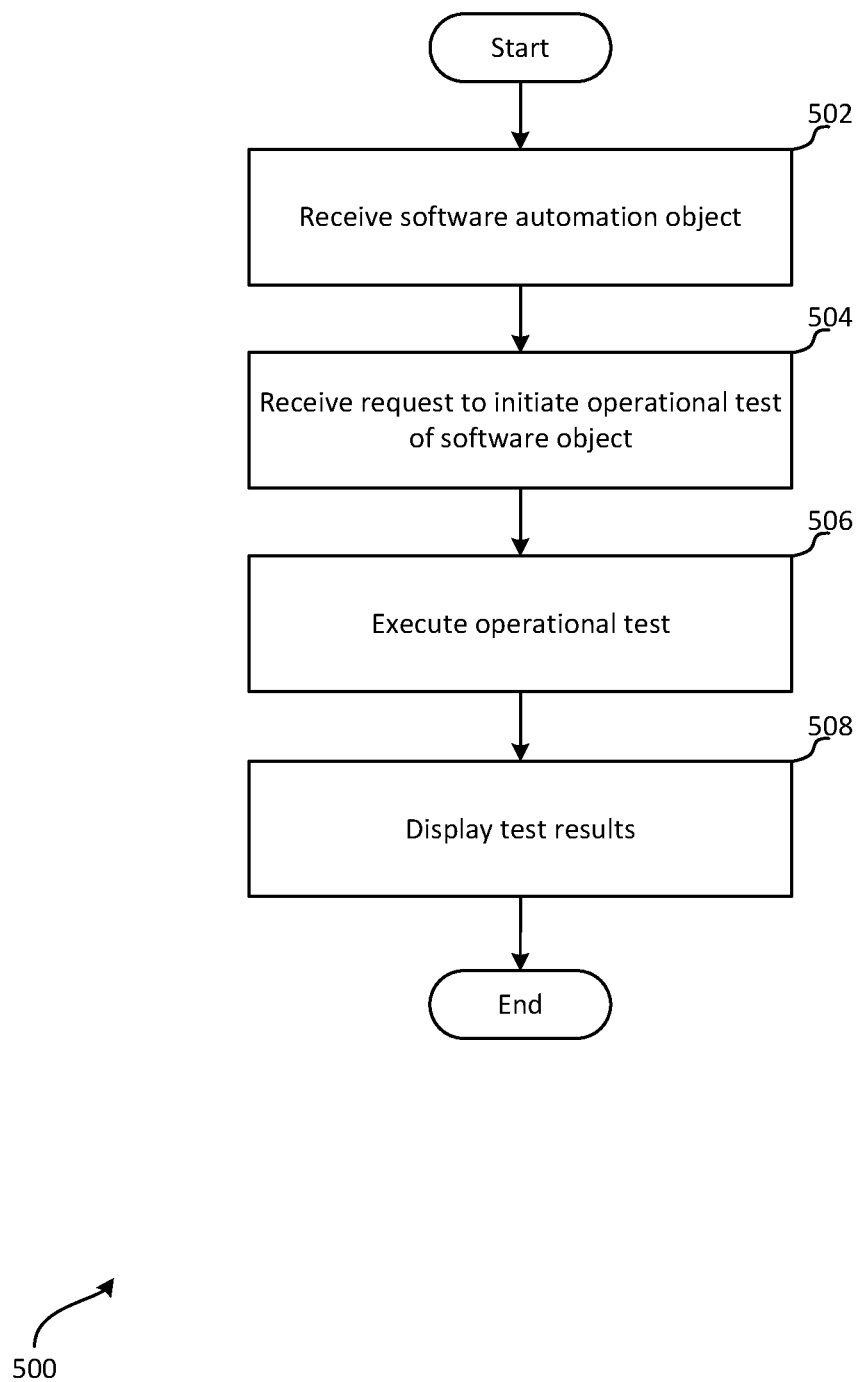
FIG. 5 illustrates an exemplary method for assisting with testing automated industrial routines.

FIG. 5 illustrates an exemplary method 500 for assisting with testing automated industrial routines. The method 500 begins at a start operation and continues to operation 502.

At operation 502 a software object is received by a test execution user interface. The software object is added to the test execution user interface from a software object library, such as software object library 108 in FIG. 1, comprising a plurality of software objects, each of which has: an automated control device layer, a human machine interface layer, and a testing layer. The software object may be identified from the software object library via a test application user interface that allows searching for software objects corresponding to hardware in automated processes by keyword or phrase, and/or via selection windows that comprise a plurality of selectable display elements that software objects are grouped in by classification type. In some examples, the selected software object may be added to a new or existing automated routine file comprising a plurality of objects corresponding to hardware in an industrial automation process/routine. The selected software object may be added to such a system by dragging and dropping it with one or more other hardware components, among other input mechanisms (clicking on a display area where the object should be added, touch input corresponding to the display area where the object should be added).

From operation 502 flow continues to operation 504 where a request to initiate an operational test of the software object in the test execution user interface is received. The operational test may be included as test script that is associated with one or more of the objects being tested. In some examples, the test script may test whether the selected object is compatible with one or more other hardware components that a user would like to add it to. In other examples, the test script may test whether criteria associated with an automation routine that a user would like to use the software object in can be fulfilled satisfactorily by the software object. In still other examples, the software object may be tested for its compatibility with one or more criteria corresponding to a virtual industrial controller that virtually replicates a controller that is to be used in an automated routine. In additional examples, a single software automation object may be run through a series of tests by a test script. For example, a valve object may be tested with various fluid types, fluids at various temperatures, various pressures, and the like. In such examples, the test script may be associated explicitly with each object in the object library, and/or there may be test scripts for each object type that are stored and retrieved separate from each object.

From operation 504 flow continues to operation 506 where the operational test of the software object is executed. A user may select the particular test script for executing, and a plurality of virtual operations corresponding to the particular test script that is run on the software object may be initialized and executed.

From operation 506 flow continues to operation 508 where test results for the operational test of the software object are caused to be displayed on the test execution user interface. In some examples, the test results may indicate whether the results were satisfactory, unsatisfactory, expected, and/or unexpected. In additional examples, the test results may indicate virtual measurements corresponding to a tested automated routine (e.g., what the flow rate for a fluid was measured at in a virtualized tested routine, what the temperature for a fluid was measured at in a virtualized tested routine, what the sensor readings were for a virtualized tested routine). In examples where unexpected results occurred, the reason and/or location for the unexpected results may be displayed.

From operation 508 flow continues to an end operation, and the method 500 ends.

Figure 6:
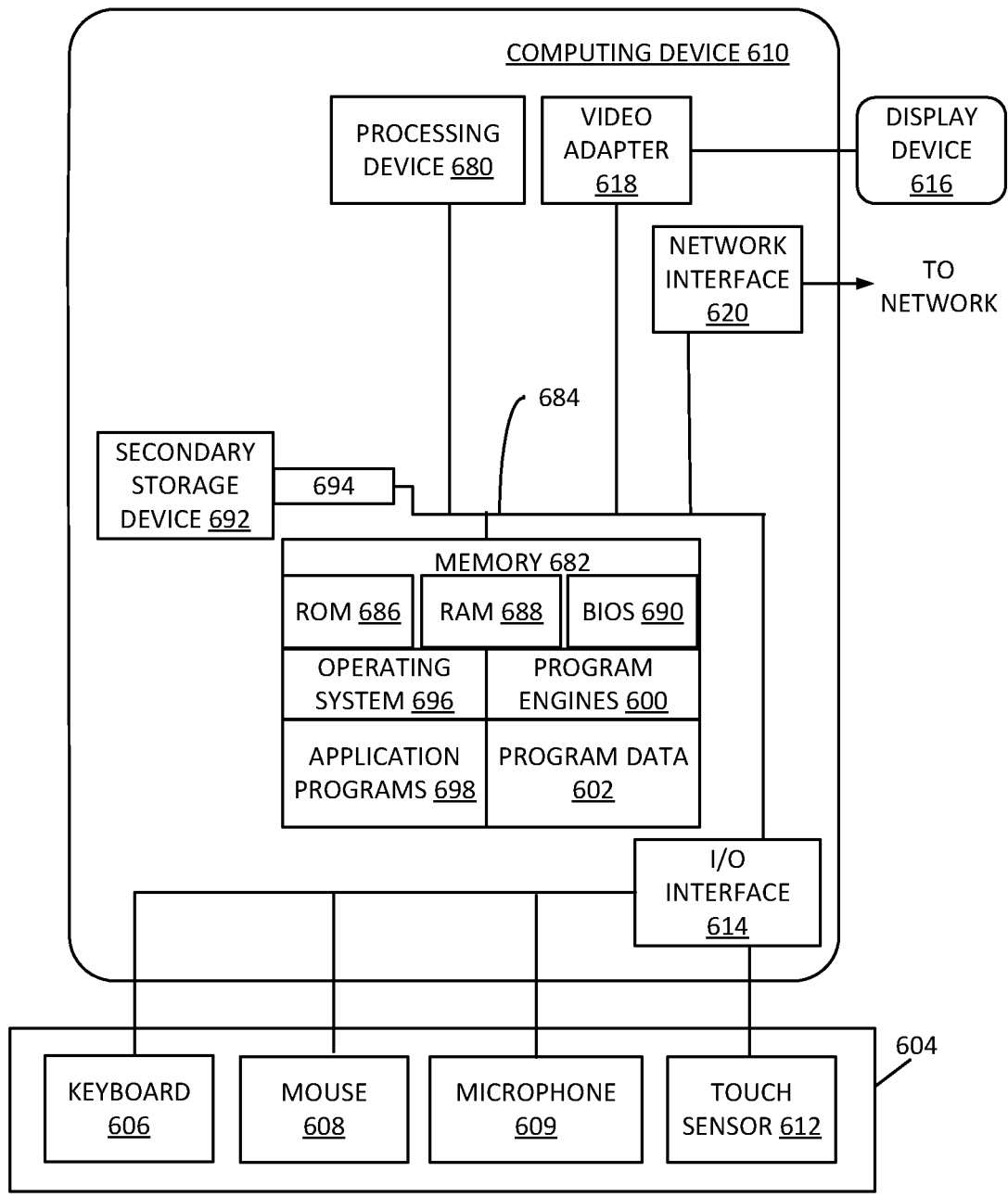
FIG. 6 is a block diagram illustrating example physical components (e.g., hardware) of a computing device with which aspects of the disclosure may be practiced.

FIG. 6 illustrates one aspect in which an exemplary architecture of a computing device according to the disclosure that can be used to implement aspects of the present disclosure, including any of the plurality of computing devices described herein with reference to the various figures and their corresponding descriptions. The computing device illustrated in FIG. 6 can be used to execute the operating system, application programs, and software modules (including the software engines) described herein, for example, with respect to FIG. 7 and program engines 714, joint rendering engine 716, module splitting engine 718, test engine 720, collaboration engine 722, and location determination engine 724. By way of example, the computing device will be described below as the industrial automation computing device 610. To avoid undue repetition, this description of the computing device will not be separately repeated for each of the other computing devices described herein, but such devices can also be configured as illustrated and described with reference to FIG. 6.

The computing device 610 includes, in some embodiments, at least one processing device 680, such as a central processing unit (CPU). A variety of processing devices are available from a variety of manufacturers, for example, Intel, Advanced Micro Devices, and/or ARM microprocessors. In this example, the computing device 610 also includes a system memory 682, and a system bus 684 that couples various system components including the system memory 682 to the processing device 680. The system bus 684 is one of any number of types of bus structures including a memory bus, or memory controller; a peripheral bus; and a local bus using any of a variety of bus architectures.

Examples of computing devices suitable for the computing device 610 include a server computer, a programmable logic controller computer, a desktop computer, a laptop computer, a tablet computer, a mobile computing device (such as a smart phone, an iPod® or iPad® mobile digital device, or other mobile devices), or other devices configured to process digital instructions.

The system memory 682 includes read only memory 686 and random access memory 688. A basic input/output system 690 containing the basic routines that act to transfer information within computing device 610, such as during start up, is typically stored in the read only memory 686.

The computing device 610 also includes a secondary storage device 692 in some embodiments, such as a hard disk drive, for storing digital data. The secondary storage device 692 is connected to the system bus 684 by a secondary storage interface 694. The secondary storage devices 692 and their associated computer readable media provide nonvolatile storage of computer readable instructions (including application programs and program engines), data structures, and other data for the computing device 610. Details regarding the secondary storage devices 692 and their associated computer readable media, as well as their associated non-volatile storage of computer readable instructions (including application programs and program engines) will be more fully described below with reference to FIG. 7.

Although the exemplary environment described herein employs a hard disk drive as a secondary storage device, other types of computer readable storage media are used in other aspects according to the disclosure. Examples of these other types of computer readable storage media include magnetic cassettes, flash memory cards, digital video disks, Bernoulli cartridges, compact disc read only memories, digital versatile disk read only memories, random access memories, or read only memories. Additional aspects may include non-transitory media. Additionally, such computer readable storage media can include local storage or cloud-based storage.

A number of program engines can be stored in secondary storage device 692 or memory 682, including an operating system 696, one or more application programs 698, other program engines 600 (such as the software engines described herein), and program data 602. The computing device 610 can utilize any suitable operating system, such as Linux, Microsoft Windows™, Google Chrome™, Apple OS, and any other operating system suitable for a computing device.

According to examples, a user provides inputs to the computing device 610 through one or more input devices 604. Examples of input devices 604 include a keyboard 606, mouse 608, microphone 609, and touch sensor 612 (such as a touchpad or touch sensitive display). Additional examples may include other input devices 604. The input devices are often connected to the processing device 680 through an input/output interface 614 that is coupled to the system bus 684. These input devices 604 can be connected by any number of input/output interfaces, such as a parallel port, serial port, game port, or a universal serial bus. Wireless communication between input devices and the interface 614 is possible as well, and includes infrared, BLUETOOTH® wireless technology, cellular and other radio frequency communication systems in some possible aspects.

In an exemplary aspect, a display device 616, such as a monitor, liquid crystal display device, projector, or touch sensitive display device, is also connected to the system bus 684 via an interface, such as a video adapter 618. In addition to the display device 616, the computing device 610 can include various other peripheral devices (not shown), such as speakers or a printer.

When used in a local area networking environment or a wide area networking environment (such as the Internet), the computing device 610 is typically connected to a network through a network interface 620, such as an Ethernet interface. Other possible embodiments use other communication devices. For example, certain aspects of the computing device 610 may include a modem for communicating across the network.

The computing device 610 typically includes at least some form of computer readable media. Computer readable media includes any available media that can be accessed by the computing device 610. By way of example, computer readable media include computer readable storage media and computer readable communication media.

Computer readable storage media includes volatile and nonvolatile, removable and non-removable media implemented in any device configured to store information such as computer readable instructions, data structures, program engines or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 610. Computer readable storage media does not include computer readable communication media.

Computer readable communication media typically embodies computer readable instructions, data structures, program engines or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 6 is also an example of programmable electronics, which may include one or more such computing devices, and when multiple computing devices are included, such computing devices can be coupled together with a suitable data communication network so as to collectively perform the various functions, methods, or operations disclosed herein.

Figure 7:
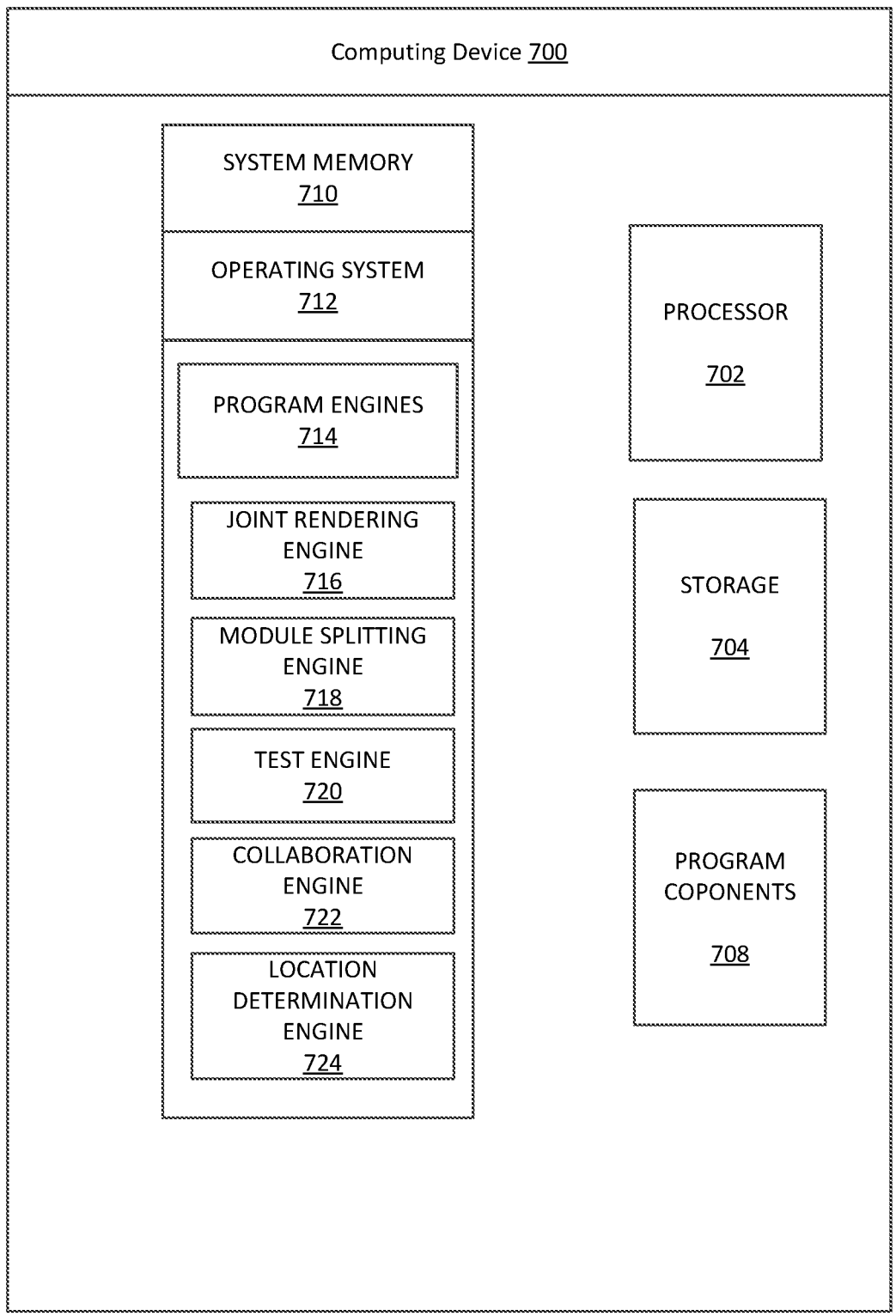
FIG. 7 is a block diagram illustrating physical components (e.g., hardware) of a computing device with which aspects of the disclosure may be practiced.

FIG. 7 is a block diagram illustrating additional physical components (e.g., hardware) of a computing device 700 with which certain aspects of the disclosure may be practiced. The computing device components described below may have computer executable instructions for: receiving an addition of a software object to a test execution user interface, wherein the software object is added to the test execution user interface from a software object library comprising a plurality of software objects, and wherein each of the plurality of software objects comprises: an automated control device layer, a human machine interface layer, and a testing layer; receiving a request to initiate an operational test of the software object in the test execution user interface; executing the operational test of the software object; and displaying test results for the operational test of the software object on the test execution user interface. Computing device 700 may perform these functions alone or in combination with a distributed computing network and/or one or more additional computing devices which may communicate and process the one or more of the program engines in FIG. 7 including joint rendering engine 716, which may perform one or more operations associated with rendering a plurality of software modules corresponding to hardware components of an automated routine/process as a singular navigable unit; module splitting engine 718, which may perform one or more operations associated with splitting at least one software module off from a collaboratively rendered software module unit; test engine 720, which may perform one or more operations associated with testing ladder logic via one or more virtual industrial controllers; collaboration engine 722, which may perform one or more operations associated with allowing users to communicate and leave notes for one another in the development of industrial automation projects; and location determination engine 724, which may perform one or more operations associated with identifying a location in a software module that has been affected by a modification to a first software module.

In a basic configuration, the computing device 700 may include at least one processor 702 and a system memory 710. Depending on the configuration and type of computing device, the system memory 710 may comprise, but is not limited to, volatile storage (e.g., random access memory), non-volatile storage (e.g., read-only memory), flash memory, or any combination of such memories. The system memory 710 may include an operating system 712 and one or more program engines 714 suitable for facilitating object-based cross-domain industrial automation control, such as one or more components in regards to FIG. 6 and, in particular, joint rendering engine 716, module splitting engine 718, test engine 720, collaboration engine 722, and location determination engine 724. The operating system 712, for example, may be suitable for controlling the operation of the computing device 700. Furthermore, aspects of the disclosure may be practiced in conjunction with a graphics library, other operating systems, or any other application program and is not limited to any particular application or system.

The computing device 700 may have additional features or functionality. For example, the computing device 700 may also include additional data storage device (removable and/or non-removable) such as, for example, magnetic disks, optical disks, or tape. Such additional storage is illustrated in FIG. 7 by storage 704. It will be well understood by those of skill in the art that storage may also occur via distributed computing networks, which are not shown in FIG. 7.

As stated above, a number of program engines and data files may be stored in the system memory 710. While executing the processor 702, the program engines 714 (e.g., joint rendering engine 716, module splitting engine 718, test engine 720, collaboration engine 722, and location determination engine 724) may perform processes including, but not limited to, the aspects described herein.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A non-transitory computer-readable medium having stored thereon instructions that, in response to execution, cause a system comprising a processor to perform operations, the operations comprising:
   inserting a first software object of a plurality of software objects into a test routine comprising other software objects of the plurality of software objects, wherein the other software objects comprise a second software object in the test routine, wherein the first software object corresponds to a first physical device of a plurality of physical devices in an automated industrial environment and the other software objects correspond to other physical devices of the plurality of physical devices in the automated industrial environment, wherein each software object of the plurality of software objects comprises a testing layer, and wherein the testing layer of each software object comprises test scripts specific to the respective software object for testing aspects of the respective software object;
   executing a first test script selected from the test scripts in the testing layer of the first software object in conjunction with a second test script selected from the test scripts of the testing layer of the second software object, wherein the first test script in conjunction with the second test script tests a compatibility between the first software object and the second software object in the test routine and a performance of the first software object in the test routine; and
   generating test results that comprise virtual measurements for the first software object.

2. The non-transitory computer-readable medium of claim 1 wherein the first software object further comprises an automated control device layer and a human machine interface layer.

3. The non-transitory computer-readable medium of claim 1, the operations further comprising:
   executing a third test script selected from the test scripts in the testing layer of the first software object to test a simulated physical property of the first software object; and
   generating second test results that comprise second virtual measurements for the first software object, wherein the second virtual measurements indicate compatibility, performance, and a measurement of the simulated physical property of the first software object.

4. The non-transitory computer-readable medium of claim 1, the operations further comprising:
   integrating a virtual industrial controller into the test routine, the virtual industrial controller having a controller test script; and
   executing the first test script in conjunction with the controller test script, wherein the first test script in conjunction with the controller test script tests a compatibility between the first software object and the virtual industrial controller.

5. The non-transitory computer-readable medium of claim 1, the operations further comprising:
   retrieving the first software object from a software object library that comprises the plurality of software objects.

6. The non-transitory computer-readable medium of claim 1, the operations further comprising:
   displaying a navigation panel comprising the plurality of software objects; and wherein:

integrating the first software object into the test routine comprises receiving a user selection in the navigation panel for the first software object and responsively integrating the first software object into the test routine.

7. The non-transitory computer-readable medium of claim 1, the operations further comprising:
receiving, via a user interface, at least one of a drag and drop operation, a click operation, or a touch operation; and wherein:
integrating the first software object into the test routine comprises integrating the first software object into the test routine in response to the at least one of the drag and drop operation, the click operation, or the touch operation.

8. A system for testing automated industrial process routines, the system comprising:
a memory that stores executable components; and
a processor, functionally coupled to the memory, that executes the executable components, the executable components comprising:
an industrial automation testing component that:
inserts a first software object of a plurality of software objects into a test routine comprising other software objects of the plurality of software objects, wherein the other software objects comprise a second software object in the test routine, wherein the first software object corresponds to a first physical device of a plurality of physical devices in an automated industrial environment and the other software objects correspond to other physical devices of the plurality of physical devices in the automated industrial environment, wherein each software object of the plurality of software objects comprises a testing layer, and wherein the testing layer of each software object comprises test scripts specific to the respective software object for testing aspects of the respective software object;
executes a first test script selected from the test scripts in the testing layer of the first software object in conjunction with a second test script selected from the test scripts of the testing layer of the second software object, wherein the first test script in conjunction with the second test script tests a compatibility between the first software object and the second software object in the test routine and a performance of the first software object in the test routine; and
generates test results that comprise virtual measurements for the first software object.

9. The system of claim 8 wherein the first software object further comprises an automated control device layer and a human machine interface layer.

10. The system of claim 8 wherein the industrial automation testing component further:
executes a third test script selected from the test scripts in the testing layer of the first software object to test a simulated physical property of the first software object; and
generates second test results that comprise second virtual measurements for the first software object, wherein the second virtual measurements indicate compatibility, performance, and a measurement of the simulated physical property of the first software object.

11. The system of claim 8 wherein the industrial automation testing component further:
integrates a virtual industrial controller into the test routine, the virtual industrial controller having a controller test script; and
executes the first test script in conjunction with the controller test script, wherein the first test script in conjunction with the controller test script tests a compatibility between the first software object and the virtual industrial controller.

12. The system of claim 8 wherein the industrial automation testing component further:
retrieves the first software object from a software object library that comprises the plurality of software objects.

13. The system of claim 8 wherein the industrial automation testing component further:
displays a navigation panel comprising the plurality of software objects;
receives, via a user interface, a user selection in the navigation panel for the first software object; and
responsively integrates the first software object into the test routine.

14. The system of claim 8 wherein the industrial automation testing component further:
receives, via a user interface, at least one of a drag and drop operation, a click operation, or a touch operation; and
integrates the first software object into the test routine in response to the at least one of the drag and drop operation, the click operation, or the touch operation.

15. A method for testing automated industrial process routines, the method comprising:
inserting a first software object of a plurality of software objects into a test routine comprising other software objects of the plurality of software objects, wherein the other software objects comprise a second software object in the test routine, wherein the first software object corresponds to a first physical device of a plurality of physical devices in an automated industrial environment and the other software objects correspond to other physical devices of the plurality of physical devices in the automated industrial environment, wherein each software object of the plurality of software objects comprises a testing layer, and wherein the testing layer of each software object comprises test scripts specific to the respective software object for testing aspects of the respective software object;
executing a first test script selected from the test scripts in the testing layer of the first software object in conjunction with a second test script selected from the test scripts of the testing layer of the second software object, wherein the first test script in conjunction with the second test script tests a compatibility between the first software object and the second software object in the test routine and a performance of the first software object in the test routine; and
generating test results that comprise virtual measurements for the first software object.

16. The method of claim 15 wherein the first software object further comprises an automated control device layer and a human machine interface layer.

17. The method of claim 15 further comprising:
executing a third test script selected from the test scripts in the testing layer of the first software object to test a simulated physical property of the first software object; and
generating second test results that comprise second virtual measurements for the first software object, wherein the second virtual measurements indicate compatibility, performance, and a measurement of the simulated physical property of the first software object.

18. The method of claim 15 further comprising:

integrating a virtual industrial controller into the test routine, the virtual industrial controller having a controller test script; and executing the first test script in conjunction with the controller test script, wherein the first test script in conjunction with the controller test script tests a compatibility between the first software object and the virtual industrial controller.

19. The method of claim 15 further comprising:

retrieving the first software object from a software object library that comprises the plurality of software objects.

20. The method of claim 15 further comprising:

displaying a navigation panel comprising the plurality of software objects; and receiving, via a user interface, a user selection comprising at least one of a drag and drop operation, a click operation, or a touch operation, wherein integrating the first software object into the test routine comprises integrating the first software object into the test routine in response to the user selection.

* * * * *